Jan. 4, 1944.    J. M. SCHMIED    2,338,358
CLUTCH FOR PORTABLE POWER DRIVEN TOOLS
Filed June 5, 1942
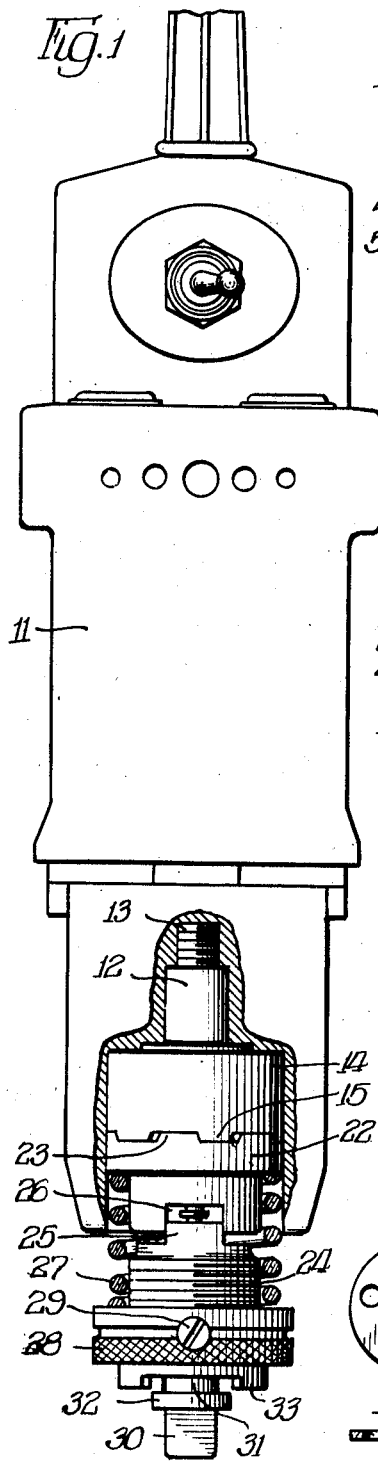
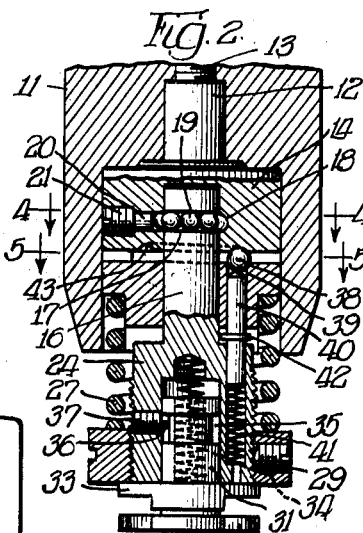
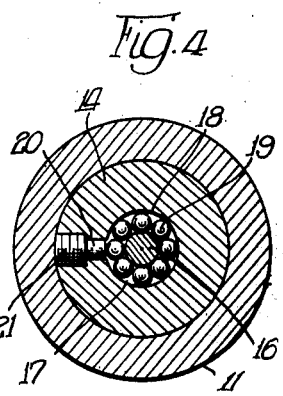
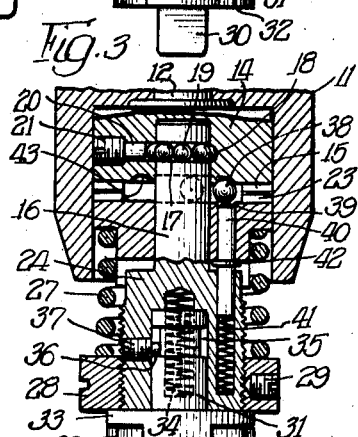
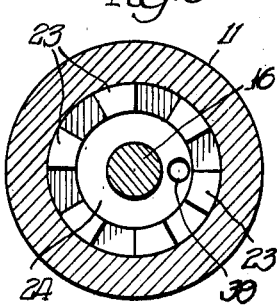
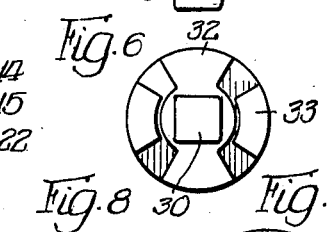
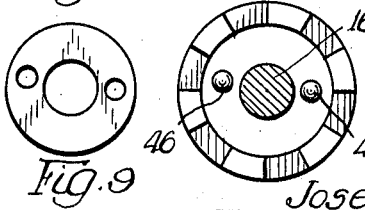
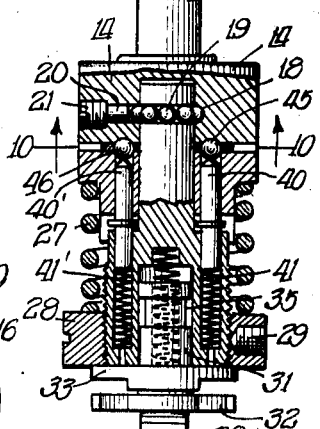
INVENTOR.
Joseph M Schmied,
BY Cromwell, Greist + Warden
ATTYS.

Patented Jan. 4, 1944

2,338,358

UNITED STATES PATENT OFFICE 2,338,358

CLUTCH FOR PORTABLE POWER-DRIVEN TOOLS

Joseph M. Schmied, Chicago, Ill., assignor to Skilsaw, Inc., Chicago, Ill., a corporation of Illinois Application June 5, 1942, Serial No. 445,847

5 Claims. (Cl. 192—30.5)

The present invention relates to clutches for portable power driven tools and has for its primary object the provision of an adjustable torque clutch which is simple in construction, economical to manufacture, and in which wear is reduced to a minimum.

An object of the invention is the provision of a clutch member for portable power driven tools which will disengage when a predetermined torque exists and which will permit relative rotation of the clutch faces for several revolutions in order to give time for the motor to speed up so that when the clutch faces reengage an adequate hammering action by the tool is obtained.

Another object of the invention is the provision of a clutch of the type referred to in which the clutch faces will not reengage in the same relative positions after each actuation by the tool so that wear of clutches of the type which employ teeth is reduced to a minimum and substantial tolerances may be allowed in the manufacture of the clutch teeth.

A still further object of the invention is the provision of means consisting of a ball or a plurality of balls for holding the clutch members disengaged so that there is very little friction for the motor to overcome during the time of disengagement.

Still another object of the invention is the provision of means in the form of a pin member having a conical shaped head which will eject a ball from a socket positioned in one of the clutch faces between the clutch members no matter in which direction the tool may be operating and which will assure the ball assuming a position between the clutch faces the moment that the clutch is disengaged.

Preferred embodiments of the invention are illustrated in the accompanying drawing and hereinafter described. It is to be understood, however, that the drawing and description are for purposes of illustration only and are not to be construed as unecessarily limiting the scope of the invention as it is defined in the appended claims.

Referring to the drawing:

Fig. 1 is a view of a power driven tool with a portion of the casing broken away to show the clutch mechanism;

Fig. 2 is a view partially in section showing the interior mechanism of the clutch when the teeth of the clutch are in engagement;

Fig. 3 is a view similar to Fig. 2 except that it shows the teeth of the clutch disengaged;

Fig. 4 is a section taken on the line 4—4 of Fig. 2;

Fig. 5 is a section taken on the line 5—5 of Fig. 2;

Fig. 6 is a view showing a clutch member positioned at the bottom of the tool for permitting engagement and disengagement of the tool with the work;

Figs. 7, 8, 9 and 10 show a modified form of the device, Fig. 7 being a vertical section through the clutch showing the interior mechanism;

Figs. 8 and 9 show a retainer member for holding the balls when a plurality of balls are employed; and Fig. 10 is a sectional view on the lines 10—10 of Fig. 7.

The tool includes the conventional housing 11 in which may be housed an electric motor or other source of motive power not shown. The clutch mechanism includes an upwardly projecting spindle 12 which is preferably screw threaded at 13 for attachment to the shaft of the electric motor or other driving mechanism. Attached to the shaft 13 is the upper clutch member 14 which is provided at its periphery with a plurality of downwardly projecting teeth 15.

Rotatably mounted within the upper clutch member 14 is a shaft 16. The shaft 16 is rotatably secured to the clutch member 14 through means of an annular groove 17 at the upper end of the shaft 14 and a groove 18 in the upper clutch member 14 and a plurality of balls 19 positioned within the groove 17 and 18. The balls 19 are inserted through an opening 20 in the upper clutch member 14. The opening 20 is closed by the screw-threaded plug 21 after the balls are in place. The balls 19 permit rotation of the shaft 16 in relation to the upper clutch member 19 but prevent axial movement of the shaft 16.

Cooperating with the clutch member 14 is a lower clutch member 22 which is provided with a plurality of upwardly projecting teeth 23 at the periphery thereof, the teeth 23 and the teeth 15 being adapted to interengage so as to transmit driving power from the clutch member 14 to the clutch member 22. The teeth 15 and 23 are beveled in accordance with well-known principles so that they will disengage when the load applied to the clutch in relation to the pressure forcing the teeth into engagement reaches a predetermined factor.

The clutch member 22 is connected for driving engagement with the shaft 16 through means of a member 24 which is integrally connected to the shaft 16 and provided with an upwardly projecting lug 25 that engages the slot 26 in the base portion of the clutch member 22. The slot and lug connection 25 and 26 prevents relative circumferential movement between the members 24 and 22 but permits limited longitudinal movement.

In order to force the teeth 15 of the clutch 14 into engagement with the teeth 23 of the clutch member 22 the coil spring 27 is provided. The spring 27 encompasses the lower portion of the clutch member 22 and the member 24. To control the amount of force which the spring brings to bear upon the clutch member 22 in forcing it into engagement with the clutch member 14 the annular member 28 is screw threaded on the member 24 and engages the base of the spring 27. The member 28 can be manipulated to compress or expand the spring 27 so that the pressure that the spring 27 exerts upon the clutch can be varied to suit the demands of the operator. A set screw 29 is provided in the member 28 so that that member may be fixed at any desired point.

The driving connection between the clutch member 22 and a screwdriver or wrench socket, not shown in the drawing, which is mounted in the squared end 30 of the shaft 31 is accomplished through means of the interlocking members 32 and 33. The member 33 is slotted to receive the member 32. The member 33 is fixedly secured to or made integral with the portion 24 of the shaft 16 so that rotation of the clutch member 22 causes rotation of the member 33. Yieldingly urging the members 32 and 33 out of engagement is a spring 34 which is partially mounted in a bore within the shaft 31 and has its upper end projecting into a bore within the member 24.

The shaft 31 is provided with an annular groove 35 near the upper end thereof into which groove projects a lug 36 mounted on the end of the screw plug 37, the latter being screw threaded into an opening in the side of the member 24. As will be apparent, the annular slot 35 in the shaft 31 permits axial movement of the shaft 31 of sufficient extent for the members 32 and 33 to be disengaged.

In the operation of the device, when a tool is applied to the member 30 the tool will not rotate until such time as the operator exerts pressure on the tool to overcome the resistance of the spring 34 and to engage the members 32 and 33. Thus, when the tool is removed from the work it will not be driven and can be readily applied to the next nut or bolt or screw, or whatever instrumentality is being worked upon.

When the screw or nut or bolt has been tightened to a predetermined extent, depending upon the pressure of the spring 27 urging the clutch members 14 and 22 into engagement, the torque will become sufficiently great so that the clutch members will separate, overcoming the resistance of the spring 27.

When the clutch teeth disengage they would normally tend to reengage as soon as the teeth had passed over each other and were again in complementary positions. In order to prevent such immediate reengagement of the clutch members and to provide time for the motor to pick up speed so that when the clutch members do reengage they will come together with sufficient driving power to hammer home the screw or nut upon which the device is operating, there is provided means for holding the clutch teeth disengaged for a desirable interval. In Figs. 1 to 6, inclusive, this means consists of a ball 38 with the necessary mechanism to project it between the clutch faces 14 and 22 to hold those faces in spaced relationship until such time as the ball drops out of position between the clutch faces and permits the teeth of the clutch to reengage. As shown in Fig. 2, when the clutch teeth are engaged the ball 38 rests in the hole 39 bored in the lower clutch member 22. Yieldingly urging the ball out of the hole 39 and between the clutch members is a pin 40 that is backed up by the spring 41. The pin 40 passes between the members 22 and 25 and through the slot 26 of the member 22. In order to secure the pin in position and limit its movement it is provided with an annular projection 42 which is located in the slot 26. The upper end of the pin 40 is conical in shape for reasons hereinafter to be described. A raceway 43 is provided in the lower face of the upper clutch member 14. A similar raceway may be provided in the lower clutch member if desired.

In the operation of the portion of the mechanism just described, when the clutch faces are forced to separate due to the fact that the torque of the motor has increased to the point that the forces holding the clutch faces together are overcome, the teeth of the clutch faces at first tend to ride on top of each other, but the spring 41 projects the ball upwardly between the clutch faces and, due to the fact that the upper end of the pin 40 is conical in shape, the ball is forced between the clutch faces into the race 43, thus separating the clutch teeth and the clutch faces will rotate freely with respect to each other until the ball has travelled around the race and dropped back into the hole 39, at which time the clutch teeth will reengage.

The head of the pin 40, being conical in shape, will urge the ball to one side and has a tendency to force it into the race between the clutch members. It has been found that if the pin is flat across the head the ball will not always move into the race when the clutch is first disengaged. However, by inclining the head of the pin in the general shape of a cone the ball will be urged into the race no matter in which direction the motor may be operating. This is a feature of importance because the clutch teeth are apt to jump out of engagement and reengage themselves almost instantaneously unless the ball is urged into the race by an inclined surface at the head of the pin. By making the pin conical in shape the ball will be urged in the direction of rotation, irrespective of which direction that may be.

The extent of rotation between the clutch faces will be determined by the diameter of the ball race 43 and the diameter of the ball 38. It has been found that it is possible to have several revolutions of the clutch members in relation to each other before the ball will return to its seat and the clutch teeth reengage. The clutch teeth will not reengage in the same relative positions, but different clutch teeth will engage each time that the tool is actuated. This feature is of importance because unless great precision is used in the manufacture of the clutch faces all of the teeth will not engage in driving positions, but the driving load will only be borne by a few or, possibly, by only one pair of teeth. However, by the mechanism disclosed, since the clutch faces reengage in different relative positions with each actuation of the tool, the load is not unduly borne by any tooth or group of teeth and the teeth tend to wear to uniform engagement.

In the modification of the device shown in Figs. 7, 8, 9 and 10 the parts are the same and are numbered as those heretofore described with the exception that a plurality of balls is provided for operation between the clutch members. The balls are indicated by the reference numerals 45 and 46, the ball 45 corresponding to the ball 38 shown in Figs. 2, 3 and 5. The ball 46 is similar thereto and the pin for ejecting it between the clutch faces is the same as the pin for ejecting the ball 38 between the clutch faces, and this pin and its associated mechanisms are indicated by the same reference numerals with the addition of the prime sign. The balls are mounted in a retainer member shown in Figs. 8 and 9 so that they are always held in the same relative positions and the bores for the pins in which the balls seat are so related to each other that the clutch faces cannot reengage until each ball has returned to its own seat.

The advantage of providing a plurality of spaced balls is that the load is distributed over them and there is no tendency for the clutch faces to be inclined relative to each other when the clutch teeth are disengaged.

I claim:

1. In a portable power driven tool a clutch comprising a pair of clutch members having co-operating teeth, one of such clutch members having a seat therein to receive a ball, a raceway between said clutch members joining with said seat, a ball and means for urging said ball from said seat into said receway to hold said clutch teeth disengaged while said ball travels the length of said raceway and returns to said seat.

2. In a portable power driven tool a clutch comprising a pair of clutch members each having teeth adapted to engage the teeth of the other, resilient means urging said clutch members into engagement, one of said clutch members having a seat on the face thereof to receive a ball, a raceway beginning at said seat, a ball, means for urging said ball from said seat into said raceway when said clutch teeth are disengaged, said means including a member having an inclined head thereon positioned beneath said ball when the same is in said seat.

3. In a portable power driven tool a clutch comprising a pair of clutch members each having teeth adapted to engage the teeth of the other, resilient means urging said clutch members into engagement, one of said clutch members having a seat on the face thereof to receive a ball, a raceway beginning at said seat, a ball, means for urging said ball from said seat into said raceway when said clutch teeth are disengaged, said means including a member having a conical shaped head thereon positioned beneath said ball when the same is in said seat.

4. In a portable power driven tool a clutch comprising a pair of clutch members each having teeth adapted to engage the teeth of the other, a plurality of ball seats positioned between said clutch members, a plurality of balls adapted to rest in said seats when said clutch members are engaged and means for urging said balls from said seats when the teeth of said clutch members are disengaged.

5. In a portable power driven tool a clutch comprising a pair of clutch members each having teeth adapted to engage the teeth of the other, a plurality of ball seats positioned between said clutch members, a plurality of balls adapted to rest in said seats when said clutch members are engaged, means for urging said balls from said seats when the teeth of said clutch members are disengaged and means for retaining said balls in spaced relationship.

JOSEPH M. SCHMIED.